J. W. AYLSWORTH.
METHOD OF FORMING ARTICLES OF NON-PLASTIC RESINIZED PHENOLS.
APPLICATION FILED MAY 1, 1909.
1,033,044.
Patented July 16, 1912.
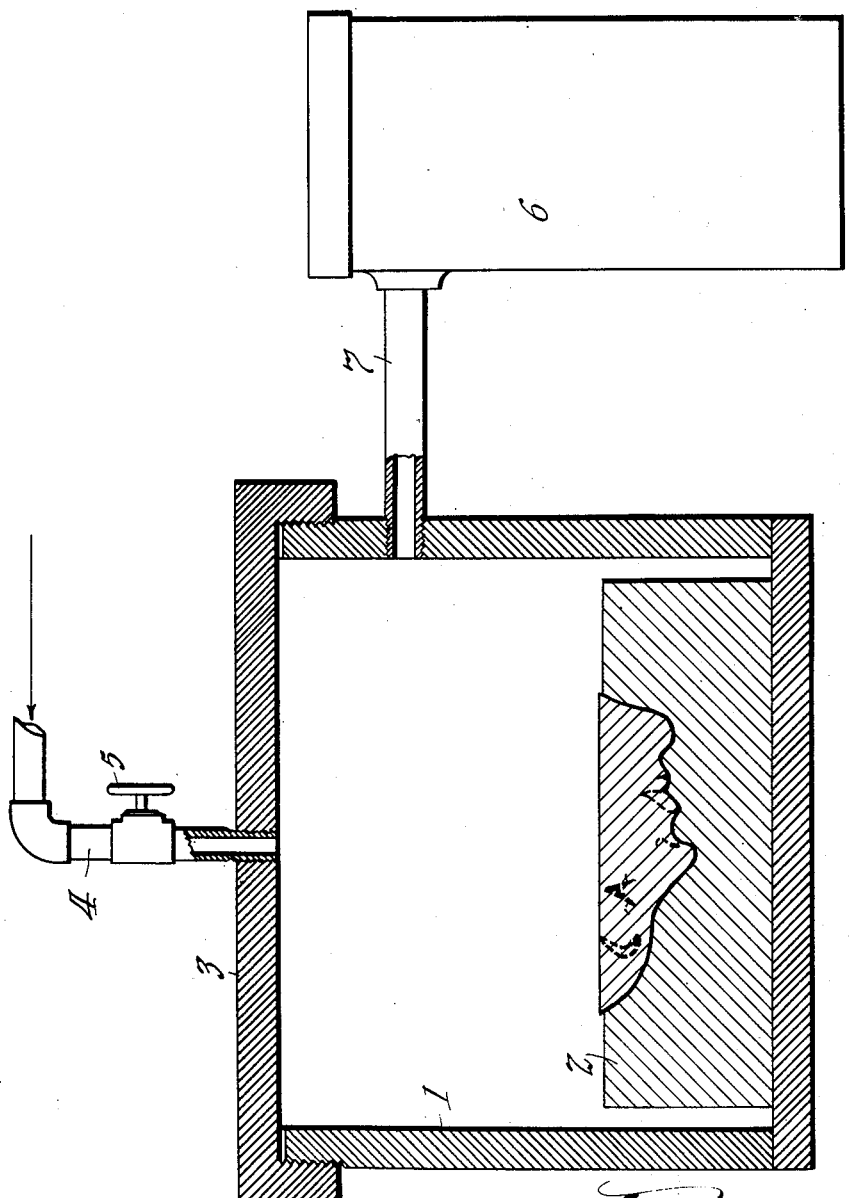

UNITED STATES PATENT OFFICE.

JONAS W. AYLSWORTH, OF EAST ORANGE, NEW JERSEY, ASSIGNOR OF ONE-HALF TO FRANK L. DYER, OF MONTCLAIR, NEW JERSEY.

METHOD OF FORMING ARTICLES OF NON-PLASTIC RESINIZED PHENOLS.

1,033,044.  Specification of Letters Patent.  Patented July 16, 1912.

Application filed May 1, 1909. Serial No. 493,259.

*To all whom it may concern:*

Be it known that I, JONAS W. AYLSWORTH, a citizen of the United States, and a resident of East Orange, in the county of Essex and State of New Jersey, have made a certain new and useful Invention in Methods of Forming Articles of Non-Plastic Resinized Phenols, of which the following is a description.
My invention relates specifically to molding useful articles from the refractory condensation products obtained by the reaction of aldehydes and phenols. As is well known, condensation products of this class may be produced which have very desirable properties, the utilization of which has heretofore been prevented by the difficulties of molding them into useful articles because of their non-plastic nature when formed. I am well aware that these substances have heretofore been molded by first forming liquid or plastic masses of the mixed ingredients in which reaction is allowed to progress to an intermediate stage, whereupon the article, either in the matrix or formed of a solid in the plastic intermediate stage, is further submitted to heat treatment under pressure, substantially in the same manner as articles are formed in the art of molding rubber and kindred substances. In attempting to practice the art in the manner described, however, considerable skill is required to form the proper intermediate plastic mass. Frequently, in such practice, failure of the operation and loss of mass occurs on account of the reaction progressing too far. I overcome these difficulties by performing the entire reaction *in situ* in the following manner: The phenol or equivalent body, that is, one which will react in the desired manner with formaldehyde or equivalent, is introduced into the matrix either alone or mixed with other relatively inert bodies, with or without the addition of a condensing or catalytic agent. This is subjected to the action of formaldehyde gas under pressure or to the action of an equivalent aldehyde gas. Formaldehyde would seem to be the best adapted of all the aldehydes for this purpose. The receptacle in which the operation is carried out may be provided with a communicating chamber containing a substance which will absorb the water vapors evolved by the reaction of the formaldehyde gas on the phenol body, and contained therein previous to the reaction. The use of this absorbing agent is not absolutely necessary, but I have found that the process is materially hastened by such use.

Sufficient pressure of the formaldehyde gas is maintained to prevent the vaporization of the phenol body from the matrix at the temperature necessary for the quick reaction of the ingredients. It has been known for many years that formaldehyde reacts with phenols to produce condensation products which may be non-soluble and infusible in their final condition, but a great difficulty has always been experienced in the evolution of gas during the process if the temperature was raised above a very low point. This gas caused the product to be very porous, and generally unfit for most uses. Experimenters have endeavored to overcome this difficulty by maintaining the heat treatment at a very low temperature, but the result of this was that the length of time required for the process was prohibitive. More lately, the tension of dissociation in this reaction has been counteracted by the subjection of the substance during the final reaction to considerable pressure. One of the features of my improved process is the use under pressure of the formaldehyde or other aldehyde gas necessary in the reaction, whereby the entire process may take place *in situ* and the subjection of the article molded after reaction of the phenol and formaldehyde to pressure other than that of the gas acting on the phenol avoided. I have found that the formaldehyde gas will react very rapidly in such apparatus if the temperature is maintained at 330° F. and higher, and that at 60 lbs. per square inch pressure and over the phenol suffers no substantial loss from vaporization. Of course, the temperature at which the operation is carried on and the pressure necessary to counteract the gases of dissociation are correlated functions, and the time necessary for the reaction is shortened as the temperature employed is raised within reasonable limits.

Attention is directed to the accompanying drawing forming part of my specification and illustrating, partly in cross section, an apparatus in which my process may be carried out.

In the drawing, 1 represents a pressure chamber in which the mold 2 or any other suitable form of mold may be placed. The chamber may be provided with a cover plate 3, which may be screwed or otherwise secured to the vertical walls of the chamber 1 to effect a gas-tight joint. The cover 3 is provided with a pipe connection 4 for conducting the formaldehyde or other gas used into the chamber, the pipe 4 being provided with a valve 5. The phenol or equivalent body is introduced into the matrix 2 with or without the addition of a suitable condensing or catalytic agent, and, as stated, the chamber 1 is closed and the formaldehyde or other gas used is forced through pipe 4 until the pressure exerted by the same within the chamber 1 has reached the proper amount, whereupon the pipe 4 is closed by means of the valve 5. The reaction is then carried out at the temperatures mentioned until the formaldehyde gas has penetrated the whole mass of the phenol body and reacted therewith to form the non-plastic refractory final condensation product.

The method is, of course, not applicable to some forms of articles, but may be used where the shape is such that the surface of the phenol or body containing the phenol may be exposed to the formaldehyde gas, and where the mass of phenol is not too thick. If the mold is at all deep, a considerable time is consumed for the action of the gas to penetrate a considerable distance below the surface.

I have found it desirable, as stated, to use a chamber as the chamber 6 connecting as by pipe 7 with the pressure chamber 1. The chamber 6 contains any substance which easily absorbs the water vapors evolved in the reaction. Such substances as quick lime, zinc chlorid, phosphoric anhydrid, or anhydrous copper sulfate may be used.

Instead of pouring the phenol body in a mold as 2, and then reacting upon the same by the formaldehyde gas under pressure, porous materials such as wood and fabrics may first be impregnated with the melted phenol or creosol, placed in a chamber such as 1, and then submitted to the action of the formaldehyde gas under pressure, as previously explained in the case of the molded article. The gas used may be supplied from cylinders in which it is contained as a liquefied gas, or it may be pumped directly from a suitable generator.

It will be understood that where in the claims I refer to "phenol" or "formaldehyde," the homologues, polymers, or derivatives equivalent to the same are included in the terms used.

Having now described my invention, what I claim and desire to secure by Letters Patent is as follows:

1. The method of forming articles of a refractory phenolic condensation product, consisting in introducing phenol into a suitable mold placed in a closed receptacle, forcing compressed formaldehyde gas into said receptacle, applying a sufficient degree of heat to cause a complete reaction between the formaldehyde and phenol, and maintaining the pressure of the gas sufficiently to counteract the liberation of gaseous products from the body being molded, substantially as described.

2. The method of forming articles of a refractory phenolic condensation product, consisting in introducing a reaction component of the finished product into a suitable mold placed in a closed receptacle, forcing into the said receptacle in the form of a compressed gas a substance which reacts with the said component on application of sufficient heat to form the desired product, applying sufficient heat to cause the desired reaction, and maintaining the pressure of the gas sufficiently to counteract the liberation of gaseous products from the body being molded, substantially as described.

3. The method of forming articles of a refractory phenolic condensation product, consisting in introducing a reaction component of the finished product into a suitable mold placed in a closed receptacle, forcing into the said receptacle in the form of a compressed gas a substance which reacts with the said component on application of sufficient heat to form the desired product, applying sufficient heat to cause a complete reaction between the said reagents and the complete transformation thereof into a final refractory condensation product, in the mold, and maintaining the pressure under which the gaseous substance is supplied to the receptacle sufficiently to counteract the liberation of gaseous products from the body being molded, substantially as described.

4. The method of forming articles of a refractory phenolic condensation product, consisting in forcing compressed formaldehyde gas into a closed receptacle in which a quantity of phenol is placed in contact with a mold surface, applying heat and causing a condensation reaction between the phenol and formaldehyde while counteracting the tendency of dissociation gases to evolve from the body being molded by the pressure under which the formaldehyde gas is supplied to the receptacle, substantially as described.

5. The method of forming articles of a refractory phenolic condensation product, consisting in introducing phenol into a suitable mold, subjecting the same to the action of formaldehyde gas under pressure, applying heat, maintaining the pressure of the gas sufficiently to counteract the tension of dissociation in the mass being molded, passing the water vapors given off during the reaction into a connected chamber containing suitable water-absorbent means, and continuing the operation until the final condensation product is produced, substantially as described.

This specification signed and witnessed this 28th day of April 1909.

JONAS W. AYLSWORTH.

Witnesses:
 DYER SMITH,
 JOHN M. CANFIELD.